Nov. 25, 1930. C. H. WILKS 1,782,643
TRACTOR WHEEL
Filed Aug. 1, 1928 2 Sheets-Sheet 1
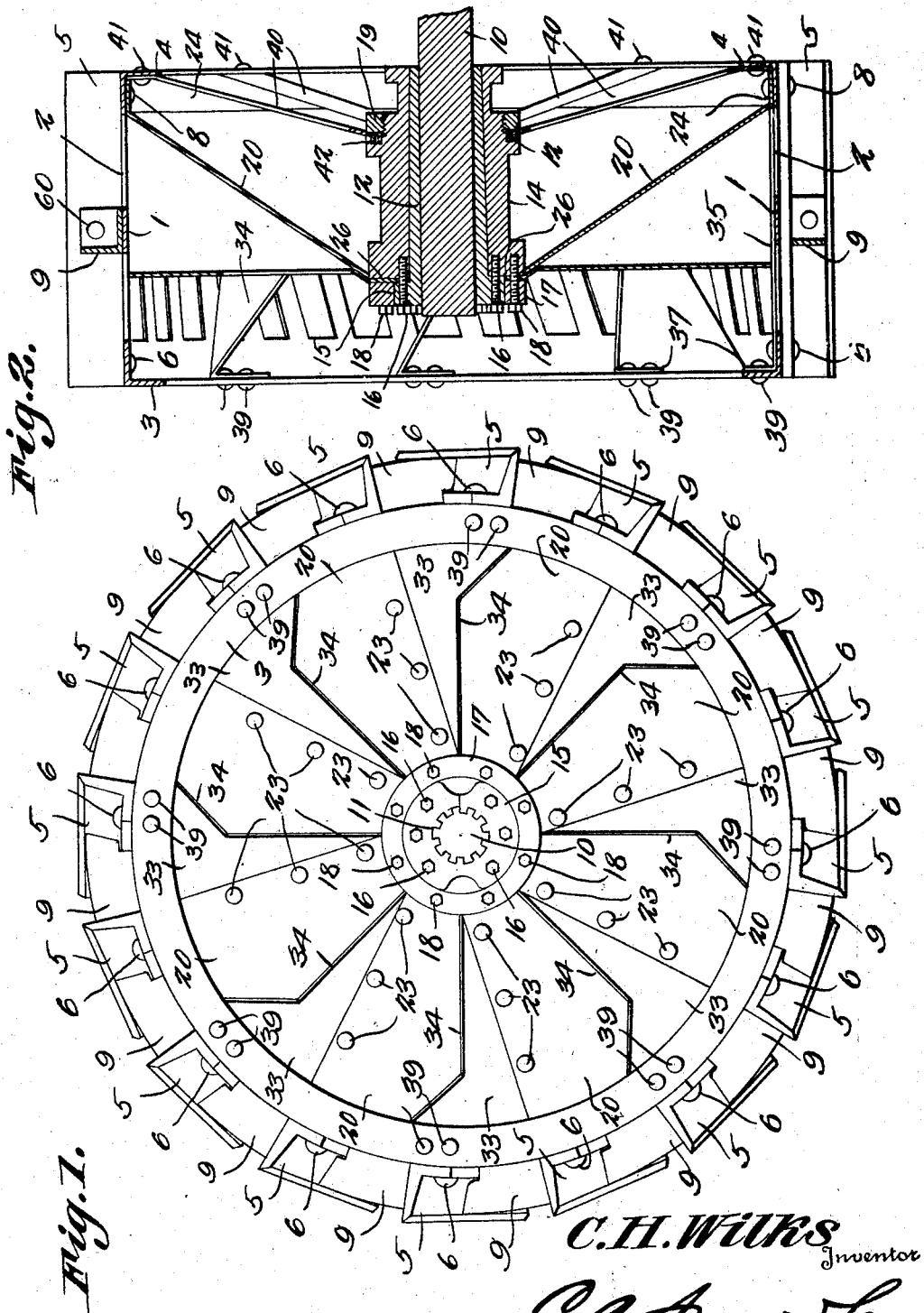

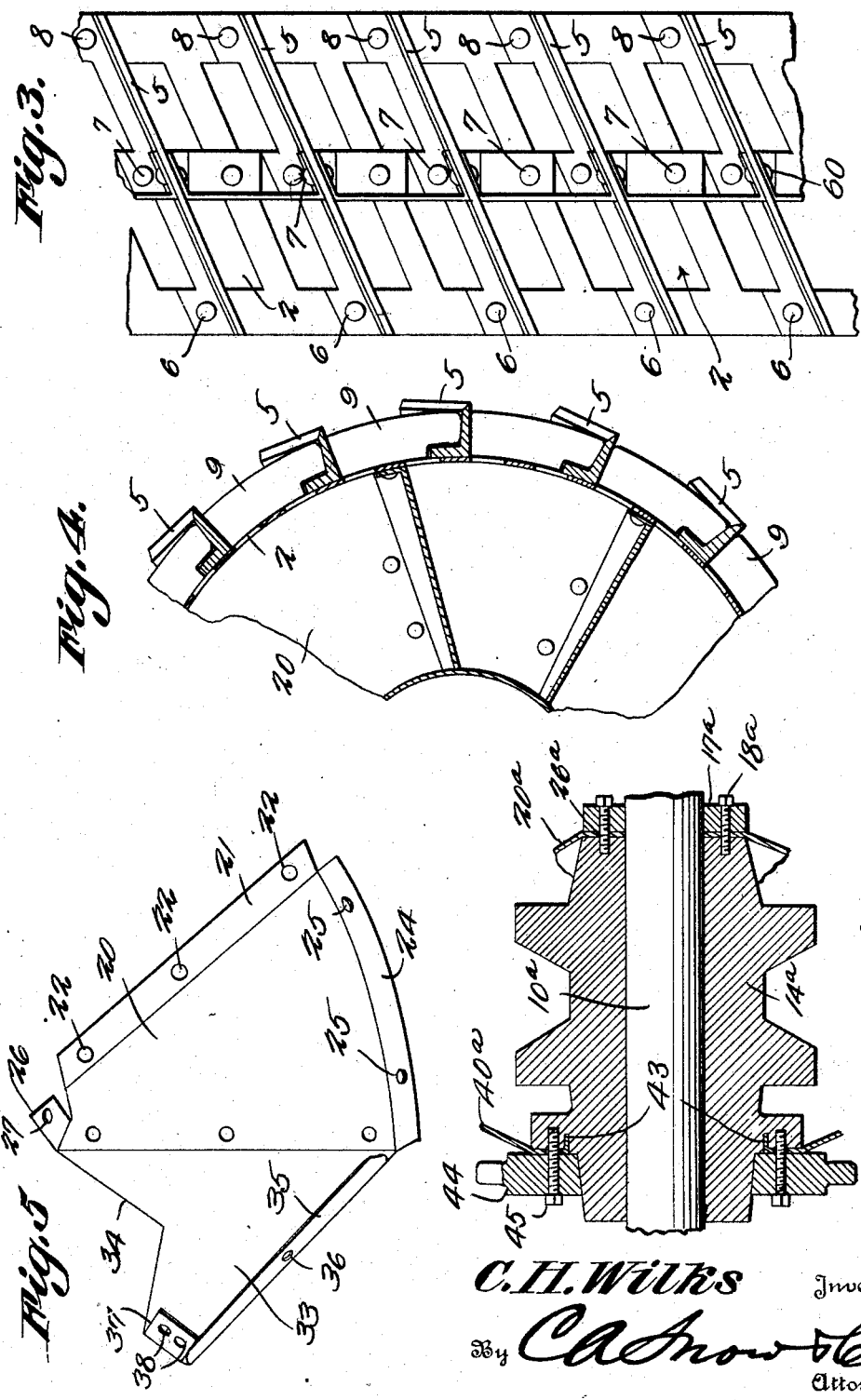

Patented Nov. 25, 1930

1,782,643

UNITED STATES PATENT OFFICE

CHARLES H. WILKS, OF MARCHE, ARKANSAS

TRACTOR WHEEL

Application filed August 1, 1928. Serial No. 296,782.

This invention aims to provide a tractor wheel which will clear itself of mud readily, and have a strong tractive hold upon the earth.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a tractor wheel constructed in accordance with the invention;

Figure 2 is a cross section of the wheel;

Figure 3 is a plan view showing a portion of the wheel;

Figure 4 is a fragmental sectional view of the wheel;

Figure 5 is a perspective view showing one of the combined spoke and mud guards;

Figure 6 is a sectional view disclosing a slight modification.

The wheel forming the subject matter of this application is made of metal throughout, and includes a tread 1 having openings 2 which are arranged at an acute angle to the line of advance of the wheel, as shown in Figure 3 of the drawings. At its edges, the tread 1 has annular inwardly projecting side pieces 3 and 4. Transverse cleats 5, which may be angle members, are attached by securing elements 6, 7 and 8 to the tread 1 and are arranged parallel to the openings 2.

Circumferential cleats 9 extend between the transverse cleats 5 and are connected to the transverse cleats, as shown at 60.

The numeral 10 marks an axle which is interengaged at 11 with a bushing 12 in a hub 14. The bushing 12 is provided at one end with an annular enlargement 15 that overlaps the end of the hub 14. Securing elements 16 pass through the enlargement 15 and enter the end of the hub 14. A ring 17 is arranged around the enlargement 15 at the end of the hub 14. Securing elements 18 pass through the ring 17 and enter the hub 14. On the opposite end of the hub 14, a ring 19 is threaded.

The wheel comprises a plurality of approximately triangular body forming members 20 having extensions 21, the extension 21 of one member 20 overlapping the next adjoining member 20, the extension 21 having openings 22 for securing elements 23 that are mounted in registered openings 32 in the member 20. The members 20 cooperate to form a conical body, the apex of which is disposed at the hub 14, and the wider end of which is disposed at the tread, as Figure 2 of the drawings will show. At its outer end, each body member 20 has a flange 24 that fits within the tread 1 at the side piece 4, as Figure 2 shows. There are holes 25 in the flange 24 for the reception of the securing elements 8.

At the inner end of the body forming member 20 there is a tongue 26 that is bound between the ring 17 and the end of the hub 14, the tongue 26 having a hole 27 for the reception of the securing element 18. On that edge of the body forming member 20 which is opposite to the extension 21 there is a wing 33 extended from one side of the wheel toward the other, with an inclination circumferentially of the wheel. In the edge of the wing 33 there is a recess 34. Along one edge of the wing 33 there is a flange 35 having an opening 36. The flange 35 extends across the wheel in contact with the inner surface of the tread 1, and the opening 36 is for the reception of the securing element 7. On the wing 33 at one end of the flange 35 there is a lip 37 having openings 38. The lip 37 fits against the inner surface of the side piece 3 of the wheel and is held thereon by securing members 39 engaged in the openings 38 and in the side piece 3.

The wheel may be provided with additional spokes 40, the outer ends of which are connected by securing devices 41 with the side piece 4 of the wheel. The inner ends of the spokes 40 are bound between the ring 19 and the hub 14, and are secured to the hub 14, by connecting elements 42.

The cleats 5 acquire a strong hold on the ground and are impelling or driving cleats, the function of the circumferential cleats 9 being to prevent lateral skidding or slipping. Owing to the presence of the openings 2, the wheel will obtain a hold upon the earth. Any earth that passes in toward the center of rotation of the wheel will be caught by the combined spokes and mud guards 20, and will be deflected laterally out of the wheel, in a way which will be understood readily when Figure 2 of the drawings is noted. The wings 33 prevent the earth from moving circumferentially within the wheel, and aid in directing the earth out of the wheel and toward the side thereof.

In the modification shown in Figure 6 of the drawings, parts hereinbefore described have been designated by numerals previously used, with the suffix "a". The axle 10ª is received within the hub 14ª. The body forming members 20ª are engaged between the ring 17ª and through the tongue 26ª. The ring 19ª of Figure 2 is replaced by a sprocket wheel 44. The spokes 40ª have extensions 43ª which extend into the hub 14ª, in a direction parallel to the axle 10ª. Securing elements 45 extend through the sprocket wheel 44, through the inner ends of the spokes 40ª and into the hub 14ª.

This invention provides a means whereby a sprocket wheel may be mounted in place, should it be desired to drive the tractor wheel by means of a sprocket chain. Owing to the length of the hub 14ª, the spokes 40ª slant inwardly in Figure 6, instead of outwardly as in Figure 2.

What is claimed is:—

1. A wheel comprising a tread, a hub, a plurality of approximately triangular body-forming members having extensions, the extension of one body-forming member overlapping the next-adjoining body-forming member, means for securing said extensions to the adjoining aforesaid members to form a conical body, that edge of each body-forming member which is opposite to the extension being provided with a wing extended from one side of the wheel toward the other, the wing being supplied along one edge with a flange extended transversely of the wheel in engagement with the inner surface of the tread, means for securing the wing to the tread, and means for securing the body to the hub.

2. A wheel comprising a tread, a hub, a plurality of approximately triangular body-forming members having extensions, the extension of one body-forming member overlapping the next-adjoining body-forming member, means for securing said extensions to the adjoining aforesaid members to form a conical body, that edge of each body-forming member which is opposite to the extension being provided with a wing extended from one side of the wheel toward the other, the wing being supplied along one edge with a flange extended transversely of the wheel in engagement with the inner surface of the tread, the flange having a lip, the tread having an inwardly-extended side piece to which the lip is secured, and means for attaching the body to the hub.

In testimony that I claim the foregoing as my own, I have hereto affixed my signature.

CHARLES H. WILKS.